United States Patent [19]

Lesartre et al.

[11] Patent Number: 5,748,934
[45] Date of Patent: May 5, 1998

[54] OPERAND DEPENDENCY TRACKING SYSTEM AND METHOD FOR A PROCESSOR THAT EXECUTES INSTRUCTIONS OUT OF ORDER AND THAT PERMITS MULTIPLE PRECISION DATA WORDS

[75] Inventors: Gregg Lesartre; Doug Quarnstrom; Jonathan P. Lotz, all of Fort Collins, Colo.

[73] Assignee: Hewlett-Packard Company, Palo Alto, Calif.

[21] Appl. No.: 658,922

[22] Filed: May 31, 1996

[51] Int. Cl.[6] .................................................. G06F 9/00
[52] U.S. Cl. ........................... 395/392; 395/393; 395/563; 395/800.23
[58] Field of Search ................................. 395/392, 393, 395/563, 800.23

[56] References Cited

U.S. PATENT DOCUMENTS

| | | | |
|---|---|---|---|
| 5,442,757 | 8/1995 | McFarland et al. | 395/394 |
| 5,550,988 | 8/1996 | Sarangdhar et al. | 395/293 |
| 5,560,032 | 9/1996 | Nguyen et al. | 395/800.23 |
| 5,606,670 | 2/1997 | Abramson et al. | 395/481 |
| 5,625,789 | 4/1997 | Hesson et al. | 395/393 |
| 5,627,983 | 5/1997 | Popescu et al. | 395/393 |
| 5,627,985 | 5/1997 | Fetterman et al. | 395/393 |
| 5,630,157 | 5/1997 | Dwyer, III | 395/800 |
| 5,644,753 | 7/1997 | Ebrahim et al. | 395/458 |
| 5,644,759 | 7/1997 | Lucas et al. | 395/587 |

*Primary Examiner*—William M. Treat
*Assistant Examiner*—Zarni Maung

[57] ABSTRACT

An operand dependency tracking system tracks operand dependencies among instructions in a processor that executes instructions out of order and that permits processing of multiple precision data words. Instructions are forwarded from an instruction fetch mechanism to a reordering mechanism, where the instructions are permitted to execute out of order. While instructions are executed in the reordering mechanism, the operand dependency tracking system is configured to perform the following: (a) detect a dependent instruction that depends upon one or more operands to be produced by a producer instruction; (b) prevent execution of the dependent instruction until after the producer instruction launches execution; (c) store a plurality of valid bits in a result register for storing a result of execution of the producer instruction, each of the valid bits corresponding with a data portion to be stored within the result register and indicative of whether each data portion is either valid or invalid; (d) launch execution of the dependent instruction after the producer instruction has already launched execution; (e) when executing the dependent instruction, determine if the operand(s) is valid based upon the valid bit(s); (f) when the operand(s) is invalid, abort execution of the dependent instruction and repeats steps (d) and (e) until the operand(s) is valid; and (g) when the operand(s) is valid, permit completion of the execution of the operand(s) by an execution unit.

8 Claims, 7 Drawing Sheets

OPERAND DEPENDENCY TRACKING SYSTEM AND METHOD FOR A PROCESSOR THAT EXECUTES INSTRUCTIONS OUT OF ORDER AND THAT PERMITS MULTIPLE PRECISION DATA WORDS

FIELD OF THE INVENTION

The present invention generally relates to computer processors that execute instructions out of order, and more particularly, to an operand dependency tracking system and method for tracking data dependencies in an out of order processor that permits multiple precision data words.

BACKGROUND OF THE INVENTION

A computer processor (processing unit) generally comprises a control unit, which directs the operation of the system, and one or more arithmetic execution units, which perform computational operations. The execution units can include an arithmetic logic unit (ALU) for integer operations and a multiply accumulate unit (MAC) for floating point operations. The overall design of a processor involves the selection of a register set(s), communication passages between these registers, and a means of directing and controlling how these operate. Normally, a processor is directed by a program, which includes of a series of instructions that are kept in a main memory. Each instruction is a group of bits, usually one or more words in length, specifying an operation to be carried out by the processor. In general, the basic cycle of a processor comprises the following steps: (a) fetch an instruction from memory into an instruction register; (b) decode the instruction (i.e., determine what it indicates should be done; each instruction indicates an operation to be performed and the data to which the operation should be applied); (c) carry out the operation specified by the instruction; and (d) determine where the next instruction is located. Normally, the next instruction is the one immediately following the current one.

However, in high performance processors, such as superscalar processors wherein two or more scaler operations are performed in parallel, the processor may be designed to execute instructions out of order, or in an order that is not consistent with that defined by the software program driving the processor. In these systems, instructions are executed when they can be executed, as opposed to when they appear in the sequence defined by the program. Moreover, after execution of out of order instructions, the results are ultimately reordered to correspond with the instruction order, prior to passing the results back to the program.

Out of order execution of instructions poses peculiar obstacles from a design perspective. One such obstacle involves instruction dependencies. An instruction, called the "dependent" instruction, is dependent upon another instruction, called the "producer" instruction, when the dependent instruction operates upon data that is produced by the producer instruction. Generally, dependent instructions are placed after their producer instructions in a software program and, therefore, in a typical processor that executes instructions in order, the dependent instructions are executed after their producer instructions. However, in a processor that executes instructions out of order, unless safeguards are implemented, it is possible that a dependent instruction may be executed prior to the producer instruction from which it depends. If this occurs, then the dependent instruction may utilize incorrect data, and the software will yield incorrect results.

As an example of a dependency problem, consider an out of order processor that permits processing of multiple precision data words, for example, double words (dw). In such a processor, an instruction may depend upon one or data portions, or operands, to be produced by another instruction. In the context of this document, an "operand" is data to be processed by an execution unit pursuant to an instruction. Moreover, each data word that awaits execution may include a set of valid data portions, invalid data portions, or a combination. In such a system, the dependent instruction should be executed and its results committed to the architecture state (i.e., made apparent to the software), only after all of the desired operands are valid and therefore available to the dependent instruction.

Thus, a heretofore unaddressed need exists in the industry for a system and method for tracking data dependencies in an out of order processor that permits multiple precision data words.

SUMMARY OF THE INVENTION

Briefly described, the invention provides for an operand dependency tracking system and method for tracking data dependencies among instructions in a processor that executes instructions out of order and that permits multiple precision data words. In such processors, an instruction may depend upon one or more instructions to produce the full data element that it requires. Moreover, a data word passed to an instruction may include valid data portions, invalid data portions, or a combination thereof. The invention provides for a way to reliably track these types of data dependencies and insure correct results with minimal hardware and relatively high performance.

The operand dependency tracking system is implemented as follows. An instruction fetch mechanism retrieves instructions for execution from, perhaps an instruction cache, and forwards the instructions to a reordering mechanism, where the instructions are permitted to execute out of order. The reordering mechanism includes a plurality of slots for receiving respective instructions. After execution, instructions are retired by a retire mechanism. The retire mechanism transforms the results of instruction execution to the architecture state so that the results are apparent to the software driving the processor.

In architecture, the operand dependency tracking system comprises abort logic that is associated with a data stream to an execution unit (e.g., a multiply accumulate unit (MAC) in the preferred embodiment), launch control logic within each slot in communication with the abort logic, and one or more operand dependency logic mechanisms situated within each slot and in communication with the launch control logic.

Each operand of an instruction is assigned to a respective operand dependency logic in a slot. The operand dependency logic detects when its corresponding operand is dependent upon a remote producer instruction. For performance reasons in the preferred embodiment, although not necessary to practice the invention, the operand dependency logic prevents the local instruction from launching execution until after the remote producer instruction launches execution. In this regard, each operand dependency logic produces a valid dependency (valdep) signal for the launch control logic to indicate whether or not its respective operand dependency is cleared.

After the local dependent instruction is permitted to launch based upon deasserted valdep signals, a multiple precision data word that includes multiple operands is retrieved from either rename registers (RR; if the producer instruction is unretired) or general registers (GR; if the producer instruction is retired) pursuant to the local dependent instruction, irrespective of whether the producer instruction corresponding with the dependent instruction has provided the desired portion(s) of the data word to the RRs or GRs. In other words, the multiple precision data word may or may not include the valid operand(s) that is needed by the dependent instruction.

The abort logic monitors the data being passed to the execution unit and determines whether the portion(s) of the data word that is required by the dependent instruction is valid within the data word. If so, then the abort logic maintains a deasserted abort signal to the launch control logic, and the execution unit is permitted to process the data. If not, the abort logic will assert an abort signal to the launch control logic, which will cause the launch control logic to abort the launch and reinitiate another launch. The forgoing cycle will continue until the data word has the desired operands in a valid condition, as determined by the abort logic.

The present invention can be viewed as a methodology for tracking operand dependencies in a processor that executes instructions out of order and that provides for multiple precision data words. More specifically, the method can be summarized as follows: (a) detecting a dependent instruction that depends upon one or more data portions, or operands, to be produced by a producer instruction; (b) preventing execution of the dependent instruction until after the producer instruction launches execution; (c) when executing the producer instruction, storing a plurality of valid bits in a result register that stores a result of execution of the producer instruction, each of the valid bits corresponding with a portion of the data word to be stored within the result register and indicative of whether each portion is either valid or invalid; (d) launching execution of the dependent instruction after the producer instruction have already launched execution; (e) when executing the dependent instruction, determining if the operand(s) is valid based upon the valid bit(s); (f) when the operand(s) is invalid, aborting execution of the dependent instruction and repeating steps (d) and (e) until the operand(s) is valid; and (g) when the operand(s) is valid, completing execution of the dependent instruction by processing the operand(s) with an execution unit.

The invention has many advantages, a few of which are delineated hereafter, as merely examples.

An advantage of the invention is that it permits out of order execution of instructions in a processor by tracking operand dependencies in an environment that permits processing of multiple precision data words.

Another advantage of the invention is that it permits tracking of operand dependencies in a processor that permits processing of multiple precision data words with minimal hardware and space requirements.

Another advantage of the invention is that it permits tracking of operand dependencies in a processor that permits processing of multiple precision data words with reliability.

Another advantage of the invention is that it is simple in design and easily implemented on a mass scale for commercial production of processors.

Other objects, features, and advantages of the present invention will become apparent to one with skill in the art upon examination of the following drawings and detailed description. It is intended that all such additional objects, features, and advantages be included herein within the scope of the present invention, as defined by the claims.

BRIEF DESCRIPTION OF THE DRAWINGS

The invention can be better understood with reference to the following drawings. The components in the drawings are not necessarily to scale, emphasis instead being placed upon clearly illustrating principles of the present invention. In the drawings, like reference numerals designate corresponding parts throughout the several views.

DETAILED DESCRIPTION OF THE PREFERRED EMBODIMENT

Figure 1:
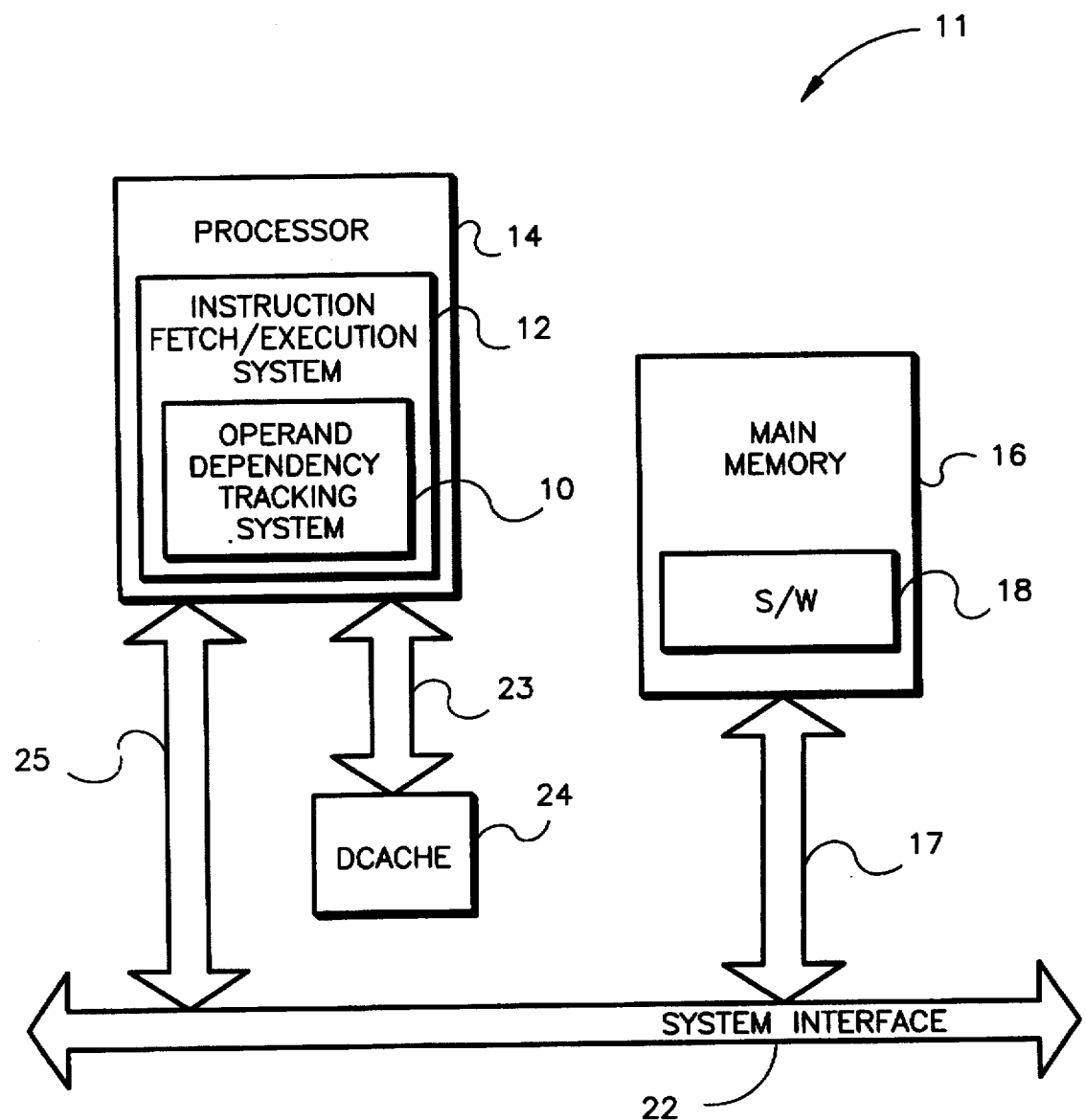
FIG. 1 is an electronic block diagram of a possible implementation of a computer that can implement the operand dependency tracking system of the invention.

As shown in FIG. 1, the operand dependency tracking system 10 and associated methodology of the present invention is implemented within a computer 11, and particularly, within a fetch/execution system 12 within a processor 14 of the computer 11. The processor 14 is configured to execute instructions out of order and permit processing of multiple precision data words, and the operand dependency tracking system 10 tracks operand dependencies associated with instructions in software (s/w) 18. The operand dependencies involve a dependent instructions that depends upon one or more operands to be produced by a producer instruction. The system 10 insures that each dependent instruction is not executed, until after its operands are produced by the producer instruction. Generally, the operand dependency tracking system 10 (FIGS. 1 and 4) is implemented in the processor 14 via the combination of abort logic (FIG. 5), control logic (FIG. 6), and operand dependency logic (FIG. 7), all of which are described in detail hereinafter.

I. Out Of Order Processor

The processor 14 that executes instructions out of order is preferably situated in a computer, an example of which is shown in FIG. 1 and denoted by reference numeral 11. The computer 11 generally includes the out of order processor 14 with the instruction fetch/execution system 12 containing the operand dependency tracking system 10, a main memory 16, such as a dynamic random access memory (DRAM), having the software 18 for driving the processor 14, a data cache 24 (dcache; optional) interconnected with the processor 14 as indicated by reference arrow 23, and a system interface 22, such as one or more buses, interconnecting the processor 14 and the main memory. Any suitable input and/or output devices may be interfaced to the system interface 22 for communicating with the computer 11. The instruction fetch/execution system 12 in the processor 14 accesses and executes the software 18. As the instruction fetch/execution system 12 executes the software 18, data that is in current use in the processor 14 is moved into the dcache 24, thereby reducing the average access time for the processor's memory requests and minimizing traffic on the system interface 22.

II. Instruction Fetch/Execution System

Figure 2:
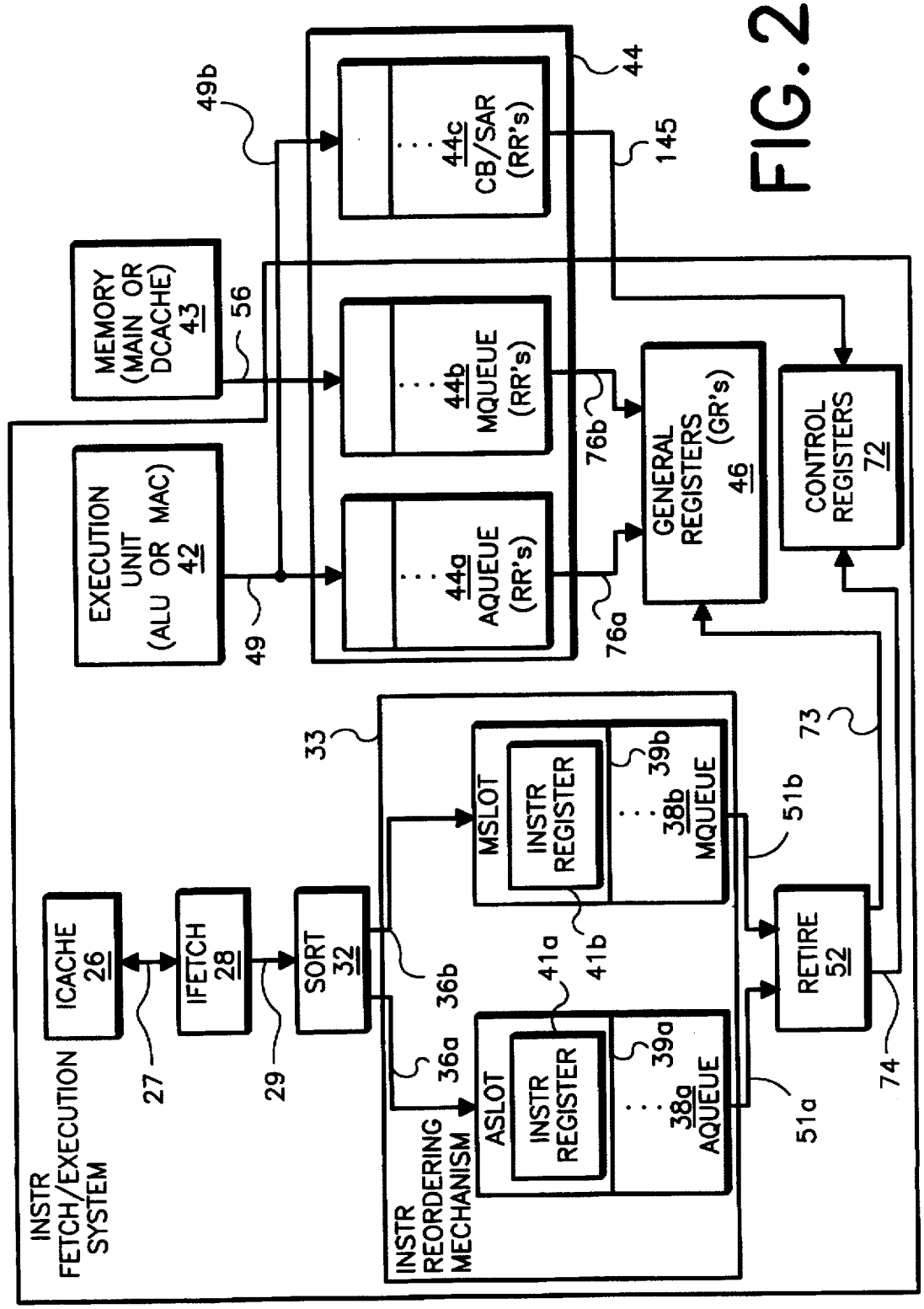
FIG. 2 is an electronic block diagram of a possible implementation of the instruction fetch/execution system within the computer of FIG. 1.

A possible implementation of the instruction fetch/ execution system 12 is illustrated by way of block diagram in FIG. 2. As shown in FIG. 2, the instruction fetch/ execution system 12 has an instruction cache (icache) 26 for storing instructions from the software 18 (FIG. 1). An instruction fetch mechanism (ifetch) 28 communicates with the instruction cache 26 and retrieves instructions from the cache 26 for ultimate execution. In the preferred embodiment, the ifetch mechanism 28 fetches four instructions, each being 32 bits, at a time and transfers the instructions to a sort mechanism 32.

From the sort mechanism 32, the instructions are sent to a suitable reordering mechanism, such as a queue(s) or reservation station(s). In the preferred embodiment, the instructions are sorted and distributed, or "inserted," into an arithmetic logic unit (ALU) queue (aqueue) and a memory queue (mqueue), depending upon the operation to be accomplished by each instruction. More specifically, the sort mechanism 32 receives the instructions from the ifetch mechanism 28 and determines whether each instruction is directed to an operation involving either (a) an arithmetic execution unit 42 (i.e., either an arithmetic logic unit (ALU) for integer operations or a multiply accumulate unit (MAC) for floating point operations) or (b) the memory 43 (i.e., the dcache 24 or the main memory 16). The sort mechanism 32 distributes arithmetic and memory instructions along respective paths 36a and 36b that are ultimately destined for the aqueue 38a and the mqueue 38b, respectively.

The aqueue 38a contains a plurality (28 in the preferred embodiment) of aslots 39a that have registers 41a for storing respective instructions that are directed to provoking operations at one or more (2 in the preferred embodiment) arithmetic logic units 42. The arithmetic instructions in the aqueue 38a are executed in any order possible (preferably, in data flow fashion). When execution of an instruction is commenced in either the aqueue 38a or the mqueue 38b, then the instruction is said have "launched." The execution unit 42 retrieves one or more operands from rename registers (RRs) 44a, 44b and general registers (GRs) 46, pursuant to each instruction, and operates upon the operands. As an instruction completes operation upon operands, the results are captured by the aqueue RRs 44a, as indicated by reference arrow 49 and the instruction is marked as complete in the particular aslot 39a of the aqueue 38a. In the preferred embodiment, the aqueue 38a receives up to four instructions (32 bits each) per cycle from the sort mechanism 32 and transfers up to two instructions (preferably, 32 bits each) per cycle to a retire mechanism 52, as indicated by reference arrow 51a.

The mqueue 38b contains a plurality (28 in the preferred embodiment) of mslots 39b. Each mslot 39b includes a register 41b for storing a respective memory instruction. Memory instructions in the mqueue 38b can be classified as "loads" and "stores" to memory. A "load" is a request to transfer data from memory 43 (the dcache 24 or the main memory 16) to a register, whereas a "store" is a request to transfer data from a register to memory 43.

During execution of a memory instruction, a first phase involves executing a prescribed mathematical operation on operands with an address calculator (not shown for simplicity) in order to compute an address, and a second phase involves accessing the memory 43 (the main memory 16 or the dcache 24) for data based upon the calculated address. The mqueue 38b executes each of the instructions by performing each of the aforementioned two phases in any order possible (preferably, in data flow fashion). As the memory instructions complete, the results are captured by the mqueue RRs 44b, as indicated by reference arrow 56, and the completed instruction is marked as complete in the mqueue 38b. In the preferred embodiment, the mqueue 38b receives up to four instructions (32 bits each) per cycle from the sort mechanism 32 and transfers up to two instructions (32 bits each) per cycle the retire mechanism 52, as indicated by reference arrow 51b.

The retire mechanism 52 receives executed instructions (preferably, two 32-bit words per cycle) from each of the queues 38a, 38b. The retire mechanism 52 commits the instruction results to the architecture state. When the retire mechanism 52 commits an instruction's results to the architecture state or when the retire mechanism 52 ignores the results of an instruction that has been nullified in one of the queues 38a, 38b, then the retire mechanism 52 is said to have "retired" the instruction. The software 18 (FIG. 1) is not made aware of any results that are not transformed to the architecture state by the retire mechanism 52. The retire mechanism 52 retires the instructions in the queues 38a, 38b in the program order defined by the software 18 by moving the instruction results to a GR 46 and/or a control register 72, as indicated by respective reference arrows 73, 74, depending upon the instruction's attributes, and causes the results of the instructions to be passed from the RRs 44a, 44b to the GRs 46, as indicated by the reference arrows 76a, 76b.

Figure 3:
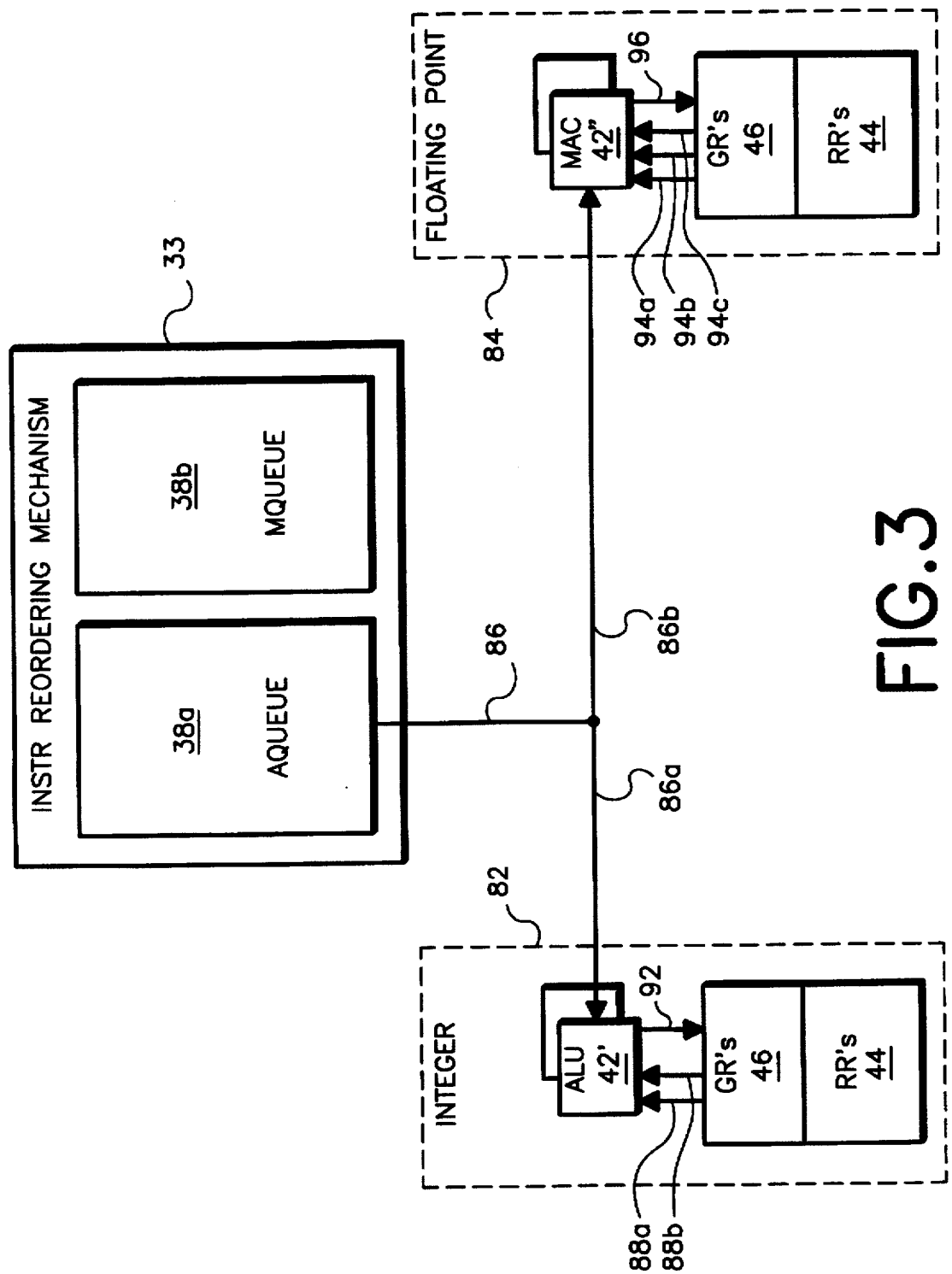
FIG. 3 is an electronic block diagram of a possible implementation of the integer and floating point (fp) data paths of the instruction fetch/execution system of FIGS. 1 and 2.

With regard to arithmetic instruction execution, the integer and floating point data paths 82, 84 of the instruction fetch/execution system 12 of FIG. 2 are illustrated in FIG. 3. As shown in FIG. 3, arithmetic instructions from the aqueue 38a are broadcast to the integer data path 82 and the floating point data path 84, as indicated by reference arrows 86a, 86b, respectively. One of the data paths 82, 84 operates upon the arithmetic instruction, depending upon whether the instruction involves an integer operation or a floating point operation.

In the preferred embodiment, more than one, preferably two, instructions are forwarded to the integer data path 82 as well as the floating point data path 84 during each cycle. Accordingly, two ALUs 42' are present in the integer data path 82 and two MACs 42" are present in the floating point data path 83 for concurrently executing respective instructions.

In the case of an arithmetic instruction dealing with an integer operation, the instruction is executed by an ALU 42'. When each ALU 42' processes its respective instruction, the ALU 42' reads up to two operands from the GRs 46 and/or the RRs 44 as indicated by reference arrows 88a, 88b. The ALU 42' then operates upon the operands to generate a result that is written to, or forwarded to, the aqueue RRs 44a, as indicated by reference arrow 92.

In the case of a floating point arithmetic instruction, the instruction is forwarded to the MAC 42". When each MAC 42" processes an instruction, the MAC 42" reads up to three operands from the GRs 46 and/or the RRs 44, as indicated by reference arrow 57. The MAC 42" then operates upon the operands and generates a result that is written to, or forwarded to, the aqueue RRs 44a, as indicated by reference arrow 96.

III. Operand Dependency Tracking System

The operand dependency tracking system 10 and associated methodology tracks operand dependencies in an out of order processor 14 that permits multiple precision data words.

Figure 4:
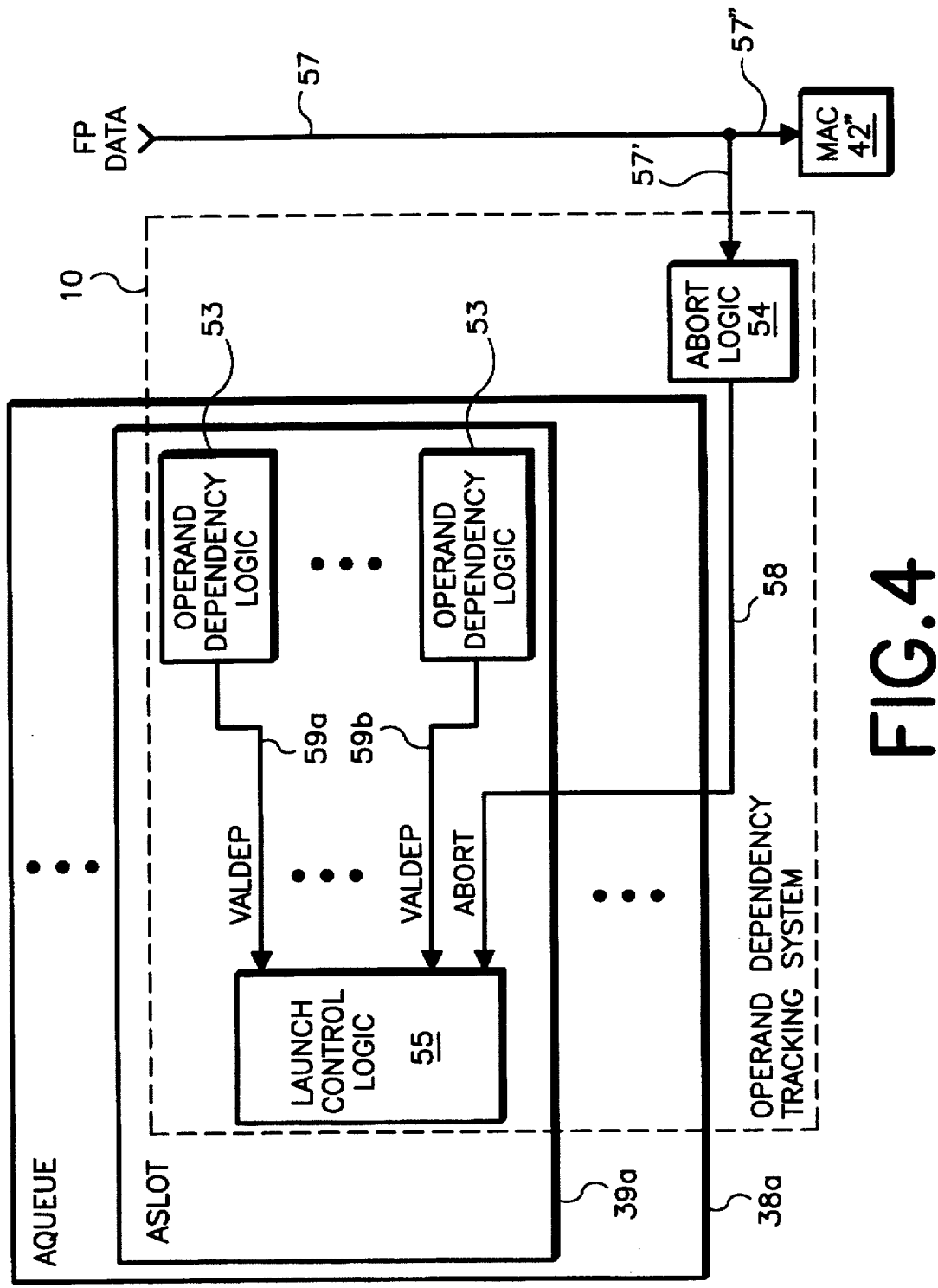
FIG. 4 is an electronic block diagram of a possible implementation of the operand dependency tracking system of FIG. 1 in accordance with the invention.

Generally, as shown in FIG. 4, the operand dependency tracking system 10 (FIG. 1) is implemented in the instruction fetch/execution system 12 within in connection 14 in connection with execution of floating point instructions. However, it should be understood that the system 10 and related methodology can be utilized in connection with any type of instruction that operates upon registers that may contain multiple precision values. Referring to FIG. 4, the operand dependency tracking system 10 of the preferred embodiment includes abort logic 54 (FIG. 5) associated with the fp data stream to the MAC 42", launch control logic (FIG. 6) within each aslot 39a in communication with the abort logic 54, and one or more operand dependency logic mechanisms 53 (FIG. 7) situated within each aslot 39a and in communication with the launch control logic 55.

In operation, each operand of a local instruction is assigned to a respective operand dependency logic 53. The operand dependency logic 53 detects when its corresponding operand is dependent upon a remote producer instruction and prevents the local instruction from launching until the remote producer instruction launches. In this regard, each operand dependency logic 53 produces a valid dependency (valdep) signal 59, which is deasserted by being precharged high during insert of an instruction, for the launch control logic 55 to indicate whether or not its respective operand is cleared.

After the local dependent instruction is permitted to launch based upon deasserted valdep signals 59a–59b, a multiple precision data word 57 that includes multiple data portions is retrieved from either the RRs 44 or the GRs 46 pursuant to the local dependent instruction. If the data come from the RRs 44, then the transfer occurs irrespective of whether the producer instruction corresponding with the dependent instruction has provided the desired data portion(s) to the RRs. In other words, a producer instruction modifies a portion(s) of the operand registers in the RRs 44 that the local instruction is dependent upon, but the producer instruction may not modify the portion(s) that the local instruction needs.

The abort logic 54 monitors the data 57, as indicated by reference arrow 57', and determines whether the operand(s) that is required by the dependent instruction is valid within the data word 57. If so, then the abort logic 54 maintains a deasserted abort signal 58 to the launch control logic 55, and the MAC 42" is permitted to process the data 57. If not, the abort logic 54 will assert an abort signal 58 to the launch control logic 55, which will cause the launch control logic 55 to abort the launch and reinitiate another launch. The forgoing cycle will continue until the data word 57 has the desired operands in a valid condition, as determined by the abort logic 54.

IV. Floating Point Execution Unit And Abort Logic

Figure 5:
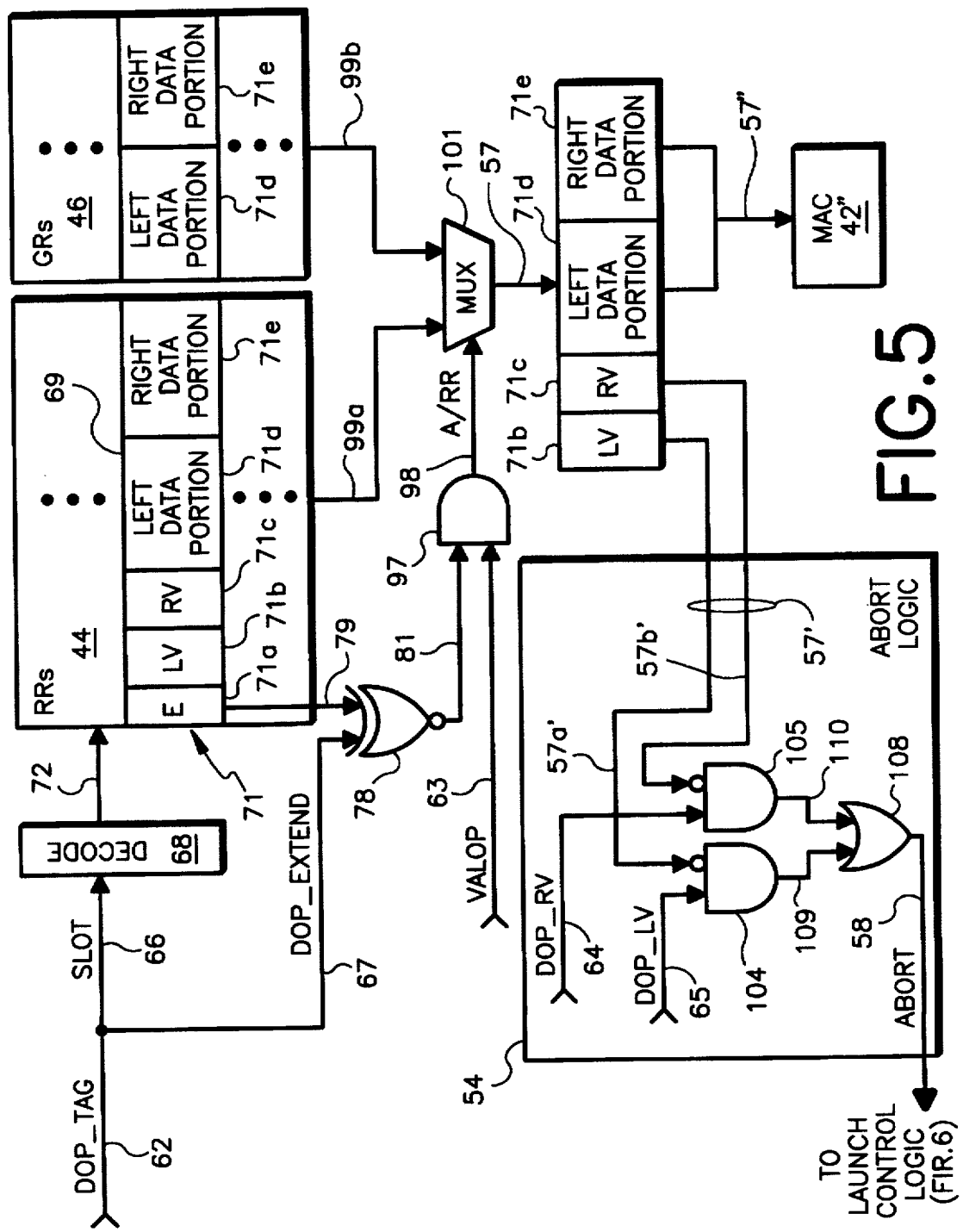
FIG. 5 is an electronic block diagram of a possible implementation of abort logic associated with the instruction fetch/execution system of FIGS. 1 and 2.

Abort logic 54 and its associated interfaces with the RRs 44, the GRs 46, and the MAC 42" are illustrated in FIG. 5 The abort logic 54 causes abortion of the execution of an instruction when the operand(s) to be utilized by the dependent instruction are not available, i.e., are not valid as yet. For this purpose, as will be further described hereinafter, the abort logic 54 forwards an abort signal 58 to the launch control logic 55 (FIG. 6) associated with the aslot 39b having the launching instruction.

In terms of timing, an instruction is first inserted into an aslot 39a. When the instruction is launched, an operand(s) may be read from the RRs 44 or the GRs 46, if the instruction is dependent upon such an operand(s). Operands are stored in either the RRs 44 when a producer instruction has not yet retired (still resides in the mqueue 38a, aqueue 38a) or in the GRs 46 when the producer instruction has already retired (and is not situated within the aqueue 38a). Just after execution but before retirement, the instruction causes a write cycle to the RRs 44 so that it can store its result until it retires and so that its result can be provided to a later dependent instruction. Further, upon retirement of the instruction, there is another read cycle to the RRs 44 so that any operands in the RRs 44 are committed to the architecture state in the GRs 46.

In order to permit reading of operands from the RRs 44 by the MAC" when an instruction is launched, the aslot 39a containing the launching instruction forwards the following signals: (a) a dependent operand tag (dop_tag) 62 that uniquely identifies the instruction, (b) a valid operand (valop) signal 63 that indicates whether or not there exists a valid operand dependency, (c) a dependent operand right valid (dop_rv) signal 64 that indicates whether or not the launching dependent instruction is requesting a valid right operand, and (d) a dependent operand left valid (dop_lv) signal 65 that indicates whether or not the launching dependent instruction is requesting a valid left operand.

In the preferred embodiment, the dependent operand tag 62 is defined and derived as follows. An aslot number is hardwired to each aslot 39a. Moreover, an extend (E) bit toggles between one and zero and is inserted into a local register in each aslot 39a upon insert of a particular instruction. The tag 62 is defined by the combination of the slot number and the extend bit, and it uniquely identifies the particular instruction, thereby distinguishing the particular instruction from a subsequent instruction that uses the same aslot 39a.

The slot number 66 from the tag 62 is passed to the RRs 44, and particularly, to a decode mechanism 68. The decode mechanism 68 decodes the slot number 66 and selects one of a plurality of registers 69 to provide the desired data word 71, which includes an extend bit (E) 71a, a left valid bit (LV) 71b, a right valid bit (RV) 71c, a left data portion 71d, and a right data portion 71e. Any number of valid bits and any number of data portions may be utilized in practicing the invention; however, the current best mode of practicing the invention utilizes two valid bits 71b, 71c and two portions 71d, 71e. Further, the decode mechanism 68 selects a register 69 via an appropriate control signal 72.

When a particular register 69 is selected by the decode mechanism 68, the extend bit 71a of the particular register 69 is passed to an exclusive-not-OR (XNOR) logic gate 78, as indicated by reference arrow 79, along with the extend bit 67 from the incoming tag 62. If the extend bits 67, 79 match, then the data word from the RRs 44 will be communicated to the MAC 42", provided that the valop signal 63 is asserted. If either the extend bits 67, 79 do not match or the valop signal 63 is deasserted, then the data word in the GRs 46 will be passed to the MAC 42".

In regard to the extend bits 67, 79, the XNOR logic gate 78 produces a match signal 81 that is combined with the valop signal 63 at an AND logic gate 97. The AND logic gate 97 in turn produces an architected/rename register (A/R) select signal 98 that determines selection between architected values and rename register values. In other words, the A/RR select signal 98 determines whether nonarchitected RR data word 99a or architected data word 99b is selected by a multiplexer (mux) 101.

The mux 101 outputs a data word 57 (see also FIGS. 3 and 4) having the LV bit 71b, the RV bit 71c, the left data portion 71d, and the right data portion 71e. The left and right operands 71d, 71e are passed to the MAC 42", as indicated by reference arrow 57". When the left and right data portions 71d, 71e come from the GRs 46, then the portions 71d, 71e are valid. However, when the left and right data portions 71d, 71e come from the RRs 44, then one, both, or none of the portions 71d, 71e may be valid, and therefore, the LV and RV bits 71b, 71c need to be checked.

In order to evaluate the LV bit 71b and the RV bit 71c to determine which operand(s) (one or two in the preferred embodiment) of the data word 102 is valid when the data word is forwarded from the RRs 44, the LV bit 71b and the RV bit 71c are forwarded to AND logic gates 104, 105, respectively, as indicated by reference arrows 57a', 57b'.

The not LV bit 71b is combined with the dop__lv signal 65 at the AND logic gate 104 in order to produce an output 109 that indicates whether or not both (a) the dependent instruction wants a left data portion 71d and (b) the data word 57 does not have a valid left data portion 71d.

The AND logic gate 105 combines the dop__rv signal 64 and the not RV bit 71c to produce an output 110. When a dependent instruction seeks a right data portion 71e, then the line 64 is asserted; otherwise, it is deasserted. Furthermore, the output 110 is asserted or deasserted to indicate whether or not respectively both (a) the dependent instruction is seeking a right data portion 71e and (b) the word 102 contains it a valid right data portion 71e.

The outputs 109, 110 are passed to an OR logic gate in order to ultimately produce the abort signal 58. Hence, as can be seen from the configuration of logic gates 104, 105 and 108, the abort signal 58 will be asserted if the dependent instruction seeks an operand that is not valid in the word 57 that is output from the mux 101; otherwise, when the dependent instruction seeks an operand(s) that is valid within the data word 57, then the abort signal 58 will be deasserted.

V. Control Logic

Figure 6:
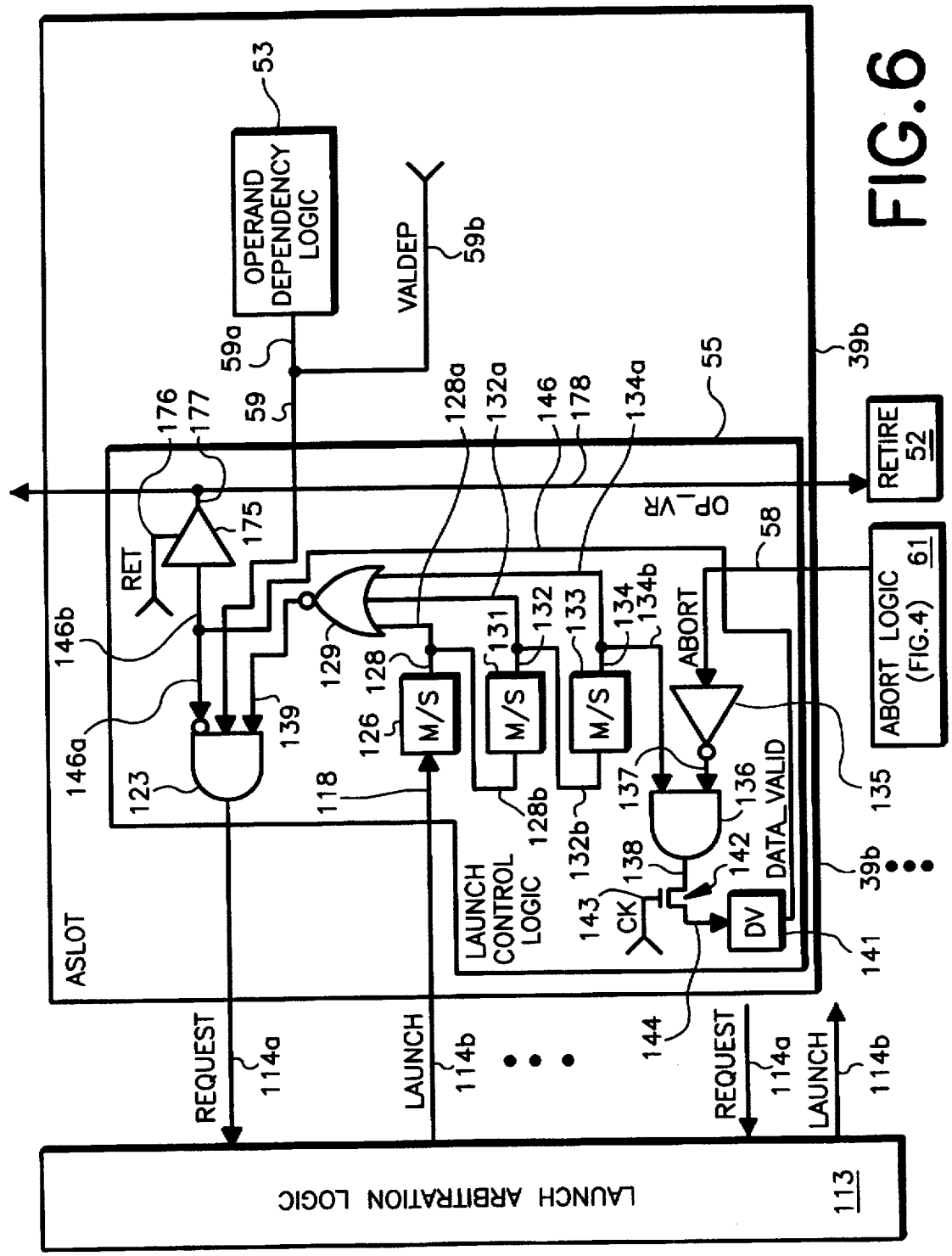
FIG. 6 is an electronic block diagram of a possible implementation of control logic and operand dependency logic situated within a arithmetic instruction slot (aslot) within the arithmetic queue (aqueue) of FIG. 2.

FIG. 6 shows in detail the launch control logic 55 within each aslot 39a of the aqueue 38a for controlling the launch and retirement of instructions in the respective aslots 39a. Generally, the launch control logic 55 will prevent the launch of a local instruction that depends upon an operand(s) to be produced by a remote producer instruction, until after the remote producer instruction commences execution. Furthermore, the launch control logic 55 will abort execution if it receives an asserted abort signal 58 (FIG. 5) from the abort mechanism 77 (FIG. 5). Finally, the launch control logic 55 will prevent the launch of a local instruction if, aside from an operand dependency, there are any other dependencies involving the local instruction, until after the dependencies are cleared.

As shown in FIG. 6, the plurality of aslots 39a are each connected to launch arbitration logic 113. The launch arbitration logic 113 is configured to receive launch requests 114a from the various aslots 39a when their respective dependencies have cleared, prioritize and arbitrate the launch requests 114a, and selectively grant requests via launch signals 114b at appropriate times. In structure, the arbitration logic 113 can be any suitable mechanism, such as a state machine, logic array, or logic processing system, configured to perform the aforementioned arbitration functionality. As an example, consider the implementation described in copending, commonly assigned, U.S. patent application entitled "Address Aggregation System And Method For Increasing Throughput Of Addresses To A Data Cache Of A Processor," filed on Mar. 1, 1996, and assigned Ser. No. 08/609,821, the disclosure of which is incorporated herein by reference. When an aslot 39a receives an asserted launch signal 114b, then the corresponding aslot 39a launches execution of its corresponding local instruction.

When the launch signal 114b is deasserted, then the corresponding aslot 39a will refrain from launching execution.

Each operand dependency logic 53 is in charge of detecting when a local instruction is dependent upon an operand that is to be produced from a remote instruction. The operand dependency logic 53 outputs a valdep signal 59a that is passed to the control logic 123. The valdep signal 59a is deasserted by being precharged high upon insert of the local instruction into the aslot 39a. When a local instruction is dependent upon an operand to be produced by a remote producer instruction, then one of the operand dependency logic mechanisms 53 will detect this dependency and assert the valdep signal 59a by pulling low the valdep signal 59a, until the dependency clears, i.e., until the producer instruction that is to provide the operand launches execution. The architecture and functionality of the operand dependency logic 53 will be further described later in detail with reference to FIG. 7.

Although an optional feature relative to the claimed invention, in the preferred embodiment, the launch control logic 55 can also receive a valdep signal 59 from other dependency tracking systems (not shown) to indicate whether or not there are any other yet uncleared dependencies that should be accommodated prior to launching of the local instruction. An example of another possible dependency tracking mechanism is that for tracking nullify operand dependencies. For a possible implementation for tracking a nullify operand dependency, see copending commonly assigned U.S. patent application Ser. No. 08/648,600 entitled "Instruction Nullification System And Method For A Processor That Executes Instructions Out Of Order," by inventor Gregg Lesartre, the disclosure of which is incorporated herein by reference.

In architecture, the launch control logic 55 includes an AND logic gate 123 for generating the request signal 118. When (a) the producer instruction has launched, (b) the local instruction is not dependent on any other instruction, (c) the local aslot 39a has not received a launch signal 114b within three cycles (five cycles in the context of a fp instruction), and (d) the local instruction has not already completed execution, then the AND logic gate 123 will request a launch with signal 118. The AND logic gate 123 receives a signal 139 to indicate whether or not the launch signal 114b is asserted within the designated three cycles, the combined valdep signal 59 to indicate whether or not the local instruction has other dependencies on other remote instructions, and a data valid signal 146 to indicate whether or not the local instruction has already calculated its result. When all the foregoing signals are asserted, then the AND logic gate 123 will assert its output 118, which thereby causes the launch control logic 55 to make a launch request 114a.

The launch signal 114b from the launch arbitration logic 113 is received by the launch control logic 55 for one aslot 39a based upon the requests 114a. As shown in FIG. 5, the launch signal 114b is passed to a master/slave (m/s) latch 126, which is clocked by the clock CK. The output 128 of the latch 126 is passed to a NOR (not OR) logic gate 129 via line 128a and is also passed to the input of another clocked m/s latch 131 via line 128b. The latch 131 is also clocked by the clock CK. The output of the latch 131 is passed to the NOR logic gate 129 via line 132a and also to the input of another clocked m/s latch 133 via line 132b. The latch 133 is also clocked by the clock CK. The output 134 of the latch 133 is passed to the NOR logic gate 129 via line 134a and also to an AND logic gate 136 via line 134b. When the launch signal 114b is asserted, the lines 128, 132, 134 are asserted on successive clock cycles. Accordingly, the NOR logic gate 129, which produces output 138, will deassert its output 138 during the first three cycles that a launch signal 114b is asserted and will assert the output 138 otherwise.

The AND logic gate 136 receives the signal 134b from the latch 133 and also receives the inversion of the abort signal 58 (FIG. 5) from the local inverter 135, which receives the abort signal 58 from the abort logic 54 (FIG. 5). When the abort signal 58 is deasserted and when the signal 134b is asserted, then the AND logic gate 136 will assert its output 138. The output 138 is clocked to a data valid (DV) latch 141 via a transistor 142 and the clock CK 143.

The DV latch 141 produces a data valid signal 146. In essence, when the data valid signal 146 is asserted, then valid data has been computed by the MAC 42". Further, when the data valid signal 146 is deasserted, then valid data has not yet been computed by the MAC 42".

The launch control logic 55 includes logic for indicating to the retire mechanism 52 (FIG. 2) when the local instruction has completed execution and is ready to be retired. In this regard, there is a retire pointer 176 for each aslot 39a, as shown in FIG. 6. The set of retire pointers indicates where the next instruction(s) to retire is located in the aqueue 39a. In the preferred embodiment, at any given time, two instructions are retired at a time and thus two retire pointers are asserted at a time, thereby indicating the oldest instructions. In essence, the retire pointers are generated from a circular shift chain with two latches in the chain containing an asserted variable ("1"), each of which transitions to a deasserted variable ("0") whenever the associated mqueue instruction retires.

Referring again to FIG. 6, a driver 175 receives the retire pointer 176. The driver 175 is configured to drive the state of the data valid signal 146 to an operand valid ready connection (op_vr; operation valid and ready to retire) 178 that is connected to the retire mechanism 52. The op_vr signal 178 indicates when a local instruction has executed a valid operation and is ready to retire.

VI. Operand Dependency Logic

Figure 7:
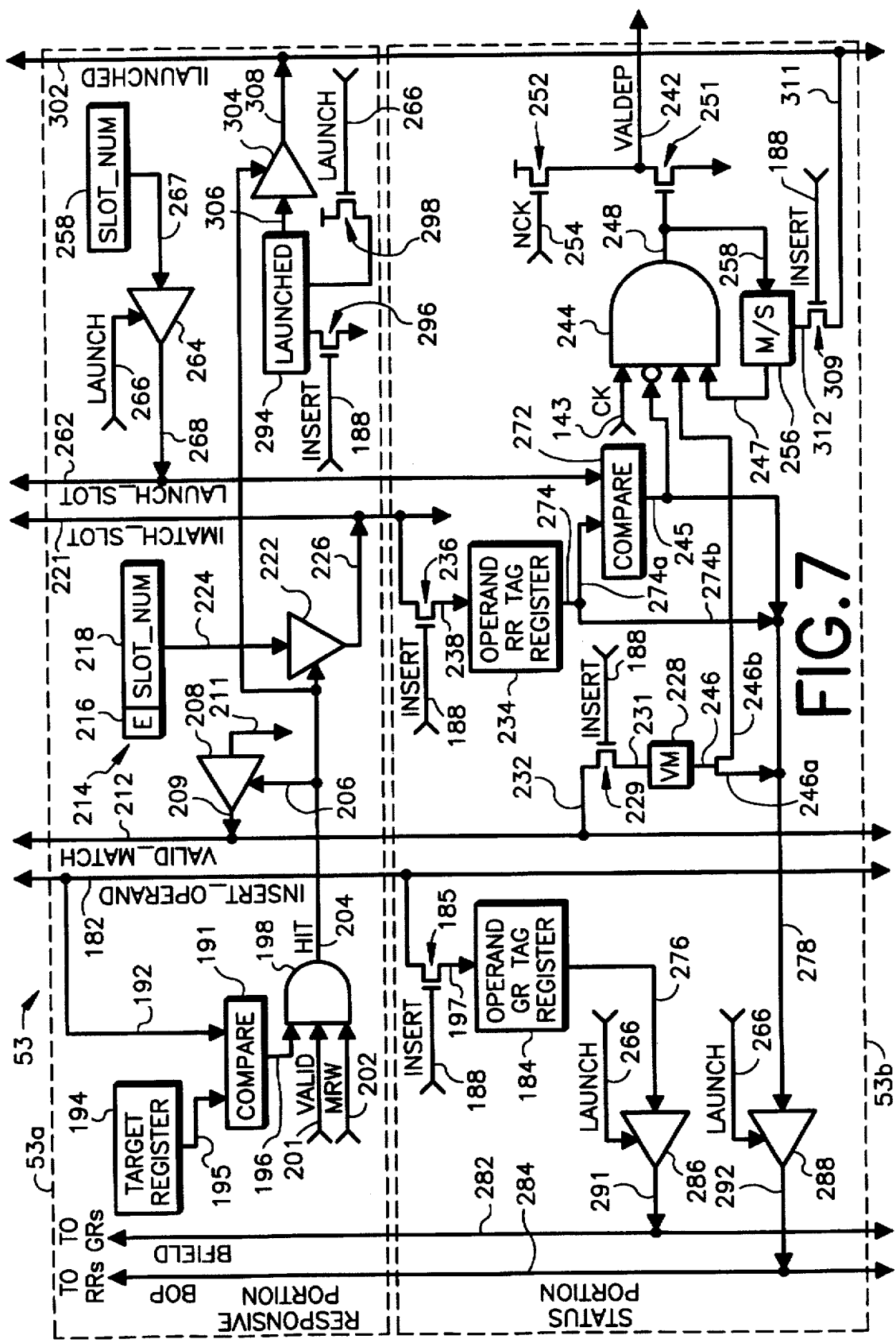
FIGS. 7 is an electronic block diagram of a possible implementation of the operand dependency logic of FIG. 6 for tracking producer and dependent instructions using a broadcast mechanism.

FIG. 7 shows an electronic block diagram corresponding with each operating dependency logic 53 (FIG. 5). Referring to FIG. 7, each operating dependency logic 53 includes a responsive portion 53a and a local instruction status portion 53b. In essence, the responsive portion 53a responds to other operations, and particularly, to other aslot status portions 53b. Moreover, the status portion 53b maintains the dependency information corresponding to a local instruction. In the preferred embodiment, each aslot 39a includes three operand dependency logic mechanisms 53, two of which are utilized for an integer instruction and three of which are utilized for a floating point instruction.

Upon insert of an instruction into a local aslot 39a, operand tags associated with the instruction are passed to respective operand dependency logic mechanisms 53. In this regard, referring to FIG. 7, an operand tag is communicated on insert operand (insert_operand) bus 182 and is passed to an operand GR tag register 184 associated with the local aslot 39a. A transistor 185 connects the operand bus 182 to the operand GR tag register 184 and is actuated by an insert signal 188.

Upon insert of the instruction into the local aslot 39a, operand tags of the local instruction are also forwarded to remote aslots 39a via bus 192 so that remote aslots 39a can determine whether they contain a producer instruction, i.e., whether they contain data for a dependent instruction. For this purpose, each aslot 39a includes a compare mechanism 191 that receives an inserted operand from bus 192 and the identification of a target register 194 associated with the local instruction, as indicated by reference arrow 195. The compare mechanism 191 produces an output 196, which is indicative of whether the local instruction is a producer for another instruction in the aqueue 39a.

An AND logic gate 198 receives the output 196 from the compare mechanism 191 along with a valid signal 201 and a most recent writer (mrw) signal 202. The valid signal 201 is asserted or deasserted to indicate respectively whether or not there is a valid instruction in the local aslot 39a. The mrw signal 202 is asserted or deasserted to indicate respectively whether or not the local producer instruction is the most recent writer to the target register in the GRs 46 (FIG. 2). The mrw signal 202 can be generated with any suitable analysis logic. Essentially, the mrw signal 202 is generated by logic that keeps track of the youngest instruction currently in the aqueue 38a that will write each active target register.

The AND logic 198 produces a hit signal 204 that is asserted or deasserted to indicate respectively whether or not the local instruction is to produce an operand for a remote dependent instruction. When the hit signal 204 is asserted, then the local aslot 39a will send appropriate signals to the remote aslot 39a that contains the dependent instruction to advise the dependent instruction of the dependency and the location of the producer instruction. In this regard, the asserted hit signal 204 pulls low the precharged valid match (valid_match) bus 212 via the driver 208 and associated connections 209, 211. The driver 208 is actuated by the hit signal 204, as indicated by reference arrow 206.

The asserted hit signal 204 also causes the local aslot 39a to dump its corresponding slot number and extend bit from a local register 214 onto an instruction match plus 221 for receipt by the remote aslot 39a containing the remote dependent instruction. In this regard, a driver 222 receives the extend bit 216 and the slot number 218, as indicated by reference arrow 224, and drives the same to the instruction match (imatch_bus) bus 221, as indicated by reference arrow 226. The driver 222 is actuated by the hit signal 204.

When the local instruction is inserted and is dependent upon a remote producer instruction, then the local aslot 39a will receive an asserted valid match signal 212, which will cause a local valid match (VM) indicator 228 to be set, as the insert signal 188 will actuate a transistor 229. The VM indicator 228 can be any suitable latch or register for storing a logic state. The local aslot 39a will also receive the extend bit 216 and slot number 218 from the remote aslot 39a containing the producer instruction from the instruction match bus 221. The extend bit 216 and the slot number 218 are stored in an operand RR tag register 234 via a transistor 236 that is actuated by the insert signal 188. The local aslot 39a will assert a valdep signal 242 when the local instruction is dependent upon any producer instruction in a remote aslot 39a. The valdep signal 242 is controlled by an AND logic gate 244. The AND logic gate receives the clock CK 143, a compare output signal 245 that indicates whether or not the remote producer instruction has just launched, a valid match signal 246 that indicates whether or not a remote instruction's target register 194 matches the local instruction's operand register 184, and a signal 247 that serves to latch the output 148 of the gate 244 to an asserted state during the life of the local instruction, once the output 248 transitions from deasserted to asserted (i.e., valdep signal 242 transitions from deasserted to asserted). The output 248 actuates a transistor 251. The valdep signal 242 is deasserted by being precharged high via transistor 252, which is clocked by the not clock signal NCK 254. Furthermore, the valdep signal 242 is pulled low via the transistor 251 when the AND logic gate 244 asserts the output 248.

In order to latch the assertion of the dependency, i.e., the assertion of the valdep signal 242, an m/s latch 256 is connected between the output 248 of the AND logic gate 244 and the input 247 to the AND logic gate 244.

When a remote producer instruction in a remote aslot 39a launches, its corresponding slot number 258 (a hardwired value) is driven to a launch slot (launch_slot) bus 262 via a driver 264. The driver 264 is actuated by a launch signal 266 from the launch control logic 55 of the corresponding aslot 39a. The slot number passes along the launch slot bus 262 to the compare mechanism 272 associated with the local aslot 39a. The compare mechanism 272 also receives the operand RR tag 274 from the local register 234. The compare mechanism 272 produces the signal 245 indicative of whether the remote slot provides data to the local slot. If it matches, then the AND logic gate 244 will deassert the valdep signal 242 and permit launching of the local instruction.

When the local instruction launches, the operand GR tag 276 and the operand RR tag 278 along with several status bits 245, 246 are output to the bfield bus 282 and the bop bus 284, respectively, via respective drivers 286, 288. The drivers 286, 288 are both actuated by the launch signal 266. The bfield bus 282 communicates the local operand GR tag 276 to the GRs 46 (FIG. 2) and the bop bus 284 communicates the operand RR tag 274, the compare output 245, and the VM indicator 246 to the RRs 44. Hence, the local instruction is able to retrieve its desired operands from the GRs 46 (FIG. 2) or the RRs 44, depending upon whether the remote producer instruction has retired or not, respectively.

In order to reset the m/s latch 256 in the local aslot 39a, a feedback mechanism from a remote aslot 39a is employed. In this regard, each aslot 39a contains a launched indicator 294, which is reset upon insert of the local instruction and set upon launch of the local instruction. Reset is accomplished via a transistor 296 and set is accomplished via a transistor 298, which is actuated by the launch signal 266. The state of the launched indicator 294 is driven to an instruction launched (ilaunched) bus 302 via a driver 304, which is actuated by the hit signal 204. The instruction launched bus 302 is connected to a transistor 309, which is actuated by the insert signal 188 and which is utilized to initialize the m/s latch 256 in a remote aslot 39a. Thus, when the local instruction is inserted into the local slot 39a, the latch 256 is reset, provided that the remote producer instruction has already launched.

Many variations and modifications may be made to the preferred embodiment of the invention as described previously. As an example, instructions in the preferred embodiment were reordered in queues 38a, 38b; however, one with skill in the art would realize that instructions can be reordered in any suitable reordering mechanism, including a reservation station. As another example, the operand dependency tracking system could be employed in connection with the integer data path, as opposed to the fp data path as in the preferred embodiment. All such modifications and variations are intended to be included herein within the scope of the present invention, as is defined by the following claims.

Finally, in the claims hereafter, the structures, materials, acts, and equivalents of all "means" elements, "logic" elements, and steps are intended to include any structures, materials, or acts for performing the functions specified in connection with said elements.

Wherefore, the following is claimed:

1. A system for tracking data dependencies in a processor that permits execution of instructions out of order and processing of multiple precision data words, comprising:

a reordering mechanism configured to receive instructions and permit execution of said instructions in an out of order sequence;

operand dependency logic associated with said reordering mechanism, said operand dependency logic configured to detect a dependent instruction that depends upon at least one data portion to be produced by a producer instruction;

a result register configured to store a plurality of valid bits and a result of execution of said producer instruction, each of said valid bits corresponding with a respective data portion of said result and indicative of whether each said respective data portion is valid; and abort logic configured to determine if said at least one data portion is valid based upon at least one of said valid bits when executing said dependent instruction, to abort execution of said dependent instruction when said at least one data portion is invalid and iteratively recommence execution and said validity determination until said at least one data portion is valid, and to permit execution of said dependent instruction when said at least one data portion is valid.

2. The system of claim 1, wherein said operand dependency logic further comprises logic configured to prevent execution of said dependent instruction until after said producer instruction launches execution.

3. The system of claim 1, wherein said producer and dependent instructions are floating point instructions and further comprising a floating point execution unit configured to process said at least one data portion.

4. The system of claim 1, further comprising:

arithmetic and memory queues associated with said reordering mechanism;

a sort mechanism configured to identify arithmetic and memory instructions that are fetched, said sort mechanism configured to distribute said arithmetic and memory instructions into said arithmetic and memory queues, respectively; and wherein said producer and said dependent instruction are placed in and executed from said arithmetic queue.

5. A method for tracking operand dependencies in a processor that executes instructions out of order and that permits multiple precision data words, comprising the steps of:

(a) launching execution of a producer instruction that is to produce at least one data portion for a dependent instruction;

(b) when executing said producer instruction, storing a plurality of valid bits in a result register for storing a result of execution of said producer instruction, each of said valid bits corresponding with a respective data portion to be stored within said result register and indicative of whether each said respective data portion is valid;

(c) launching execution of said dependent instruction;

(d) when executing said dependent instruction, determining if said at least one data portion is valid based upon at least one of said valid bits;

(e) when said at least one data portion is invalid, aborting execution of said dependent instruction and repeating steps (c) and (d) until said at least one data portion is valid; and (f) when said at least one data portion is valid, permitting completion of said execution of said dependent instruction.

6. The method of claim 5, further comprising the steps of:

detecting that said dependent instruction depends upon said at least one data portion to be produced by said producer instruction; and preventing execution of said dependent instruction until after said producer instruction launches execution.

7. The method of claim 5, wherein said producer and dependent instructions are floating point instructions and further comprising the step of, when said at least one data portion is valid, then forwarding said at least one data portion to a floating point execution unit.

8. The method of claim 5, further comprising the steps of:

distributing arithmetic and memory instructions into respective arithmetic and memory queues; and performing steps (a) through (f) upon corresponding instructions in said arithmetic queue.

* * * * *